US007968197B2

(12) United States Patent
Barancyk et al.

(10) Patent No.: US 7,968,197 B2
(45) Date of Patent: Jun. 28, 2011

(54) POLYUREA COATING COMPRISING AN AMINE/(METH)ACRYLATE OLIGOMERIC REACTION PRODUCT

(75) Inventors: Steven V. Barancyk, Wexford, PA (US); Thomas R. Hockswender, Gibsonia, PA (US); John Furar, Pittsburgh, PA (US); Ronald R. Ambrose, Pittsburgh, PA (US); Jonathan T. Martz, Glenshaw, PA (US); Howard Senkfor, South Euclid, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 954 days.

(21) Appl. No.: 11/611,979

(22) Filed: Dec. 18, 2006

(65) Prior Publication Data

US 2007/0160851 A1 Jul. 12, 2007

Related U.S. Application Data

(63) Continuation-in-part of application No. 12/211,188, filed on Aug. 25, 2005, now Pat. No. 7,611,772.

(51) Int. Cl.
*B32B 27/00* (2006.01)
*C08G 18/32* (2006.01)
*C08G 18/60* (2006.01)

(52) U.S. Cl. ............ 428/423.1; 525/452; 525/453; 525/458; 528/68; 528/288; 428/425.8

(58) Field of Classification Search ............ None
See application file for complete search history.

(56) References Cited

U.S. PATENT DOCUMENTS

| | | | |
|---|---|---|---|
| 3,963,771 A | 6/1976 | Robson et al. | |
| 4,045,416 A | 8/1977 | Robson et al. | |
| 4,431,790 A | 2/1984 | Umeda et al. | |
| 4,581,407 A * | 4/1986 | Schmid | 524/548 |
| 4,608,409 A * | 8/1986 | Coady et al. | 524/199 |
| 4,690,501 A * | 9/1987 | Zimmerman et al. | 385/141 |
| 4,742,147 A * | 5/1988 | Nichols | 528/75 |
| 5,192,814 A | 3/1993 | Oshima et al. | |
| 5,306,764 A | 4/1994 | Chen | |
| 5,359,123 A | 10/1994 | Ohshima et al. | |
| 5,367,095 A | 11/1994 | Ohshima et al. | |
| 5,550,198 A | 8/1996 | Oshima et al. | |
| 5,674,942 A * | 10/1997 | Hill et al. | 525/131 |
| 6,369,189 B1 | 4/2002 | Naderhoff et al. | |
| 6,613,389 B2 | 9/2003 | Li et al. | |
| 7,001,948 B2 | 2/2006 | Gupta et al. | |
| 2006/0046068 A1 | 3/2006 | Barancyk et al. | |
| 2006/0068198 A1 | 3/2006 | Bratys et al. | |
| 2006/0155055 A1 | 7/2006 | Reinartz et al. | |

FOREIGN PATENT DOCUMENTS

| | | |
|---|---|---|
| EP | 0528432 A2 | 2/1993 |
| JP | 1990-2-251515 | 10/1990 |

OTHER PUBLICATIONS

Rozenberg, B. A. et al., "Synthesis of New Poly(ester di(meth)acrylate)s Based on Hydroxyalkyl (Meth)acrylates", Polymer Science, Ser. A., vol. 47, No. 6, 2005, pp. 582-589.
Takas, Timothy P., "100% Solids Aliphatic Polyurea Coatings for Direct-to-Metal Applications", JCT CoatingsTech, May 2004, pp. 40-45.
U.S. Appl. No. 11/611,982, filed Dec. 18, 2006, entitled "Polyurea Coating Comprising an Amine/(Meth)Acrylate Oligomeric Reaction Product", Steven V. Barancyk et al.
U.S. Appl. No. 11/611,984, filed Dec. 18, 2006, entitled "Substrates Coated With a Polyurea Comprising a (Meth)Acrylated Amine Reaction Product", Jonathan T. Martz et al.
U.S. Appl. No. 11/611,986, filed Dec. 18, 2006, entitled "Triamine/Aspartate Curative and Coatings Comprising the Same", Howard Senkfor et al.
U.S. Appl. No. 11/611,987, filed Dec. 18, 2006, entitled "Golf Balls Comprising (Meth)Acrylated Amine Curatives", Constantine A. Kondos et al.
U.S. Appl. No. 11/611,988, filed Dec. 18, 2006, entitled "(Meth)Acrylate/Aspartate Amine Curatives and Coatings and Articles Comprising the Same", Steve Barancyk et al.

* cited by examiner

*Primary Examiner* — John J Figueroa
(74) *Attorney, Agent, or Firm* — Diane R. Meyers; Krisanne Shideler

(57) ABSTRACT

Coating compositions comprising a polyurea formed from a reaction mixture comprising isocyanate and an acrylated amine are disclosed. The (meth)acrylated amine is the reaction product of a polyamine and a (meth)acrylate; when the (meth)acrylate comprises a poly(meth)acrylate, the reaction product further comprises a mono(meth)acrylate and/or a monoamine. Methods for using the coatings, and substrates coated therewith, are also disclosed.

25 Claims, No Drawings

POLYUREA COATING COMPRISING AN AMINE/(METH)ACRYLATE OLIGOMERIC REACTION PRODUCT

CROSS-REFERENCE TO RELATED APPLICATIONS

This patent application is a Continuation-In-Part (CIP) of patent application Ser. No. 11/211,188 filed on Aug. 25, 2005, hereby incorporated by reference in its entirety.

FIELD OF THE INVENTION

The present invention is directed to a coating composition comprising polyurea formed from a reaction mixture comprising a first component comprising isocyanate and a second component comprising a reaction product of a polyamine, a poly(meth)acrylate, and a mono(meth)acrylate or a monoamine.

BACKGROUND OF THE INVENTION

Coating compositions comprising polyureas are used in a wide variety of industries such as automotive, watercraft, aircraft, industrial, construction, military, recreational equipment including sports equipment and the like. In these industries, considerable efforts have been made to develop coating compositions that will impart the desired properties to the substrate or article being coated. For example, coatings are used to protect against damage due to corrosion, abrasion, impact, chemicals, ultraviolet light, flame, heat, and/or other environmental exposure. In addition to any of these functional properties, coatings can also be used for decorative purposes.

Polyureas are generally formed by reacting amines and isocyanates. The use of amines such as polyamines as crosslinkers or "curatives" is well known. For example, amines are known to crosslink with isocyanates to form urea compounds. Amines are also known to be reactive with, and therefore used with, activated unsaturated groups, epoxy groups, aromatic activated aldehyde groups, cyclic carbonate groups, and acid and anhydride and ester groups. Polyamine crosslinkers with primary amino groups can be quite reactive with some of these functionalities under ambient or low temperature conditions (i.e. less than 100° C.). This high reactivity can result in too short a potlife or other difficulties in application, such as in high pressure impingement spraying. Certain aliphatic secondary amines, however, are not reactive enough with these various functionalities. It is therefore desired to provide amine curatives that are sufficiently reactive, but that provide an adequate potlife. There is a further desire to provide such amine curatives that impart the desired characteristics to the final composition in which they are used.

SUMMARY OF THE INVENTION

The present invention is directed to a coating composition comprising polyurea formed from a reaction mixture comprising a first component comprising isocyanate and a second component comprising a reaction product of a polyamine, a poly(meth)acrylate, and a mono(meth)acrylate or a monoamine.

The present invention is further directed to methods for coating a substrate using such coatings, and substrate coated thereby.

DETAILED DESCRIPTION OF THE INVENTION

The present invention is directed to a coating composition comprising polyurea formed from a reaction mixture comprising a first component comprising isocyanate and a second component comprising a reaction product of a polyamine, a poly(meth)acrylate, and a mono(meth)acrylate or a monoamine. The reaction product is sometimes referred to herein as a (meth)acrylated amine or like terms, or the amine/(meth) acrylate oligomeric reaction product or like terms, and that reaction product may be referred to herein as a "curative" because it will react or cure with the isocyanate to form a polyurea. In certain embodiments, the ratio of equivalents of isocyanate groups to equivalents of amine groups is greater than 1 and the isocyanate and the amine/(meth)acrylate oligomeric reaction product can be applied to a substrate at a volume mixing ratio of 1:1.

As used herein, the term "isocyanate" includes unblocked compounds capable of forming a covalent bond with a reactive group such as a hydroxyl or amine functional group. Thus, isocyanate can refer to "free isocyanate", which will be understood to those skilled in the art. In alternate non-limiting embodiments, the isocyanate of the present invention can be monofunctional containing one isocyanate functional group (NCO) or the isocyanate used in the present invention can be polyfunctional containing two or more isocyanate functional groups (NCOs).

Suitable isocyanates for use in the present invention are numerous and can vary widely. Such isocyanates can include those that are known in the art. Non-limiting examples of suitable isocyanates can include monomeric and/or polymeric isocyanates. The polyisocyanates can be selected from monomers, prepolymers, oligomers, or blends thereof. In an embodiment, the polyisocyanate can be $C_2$-$C_{20}$ linear, branched, cyclic, aromatic, or blends thereof.

Suitable isocyanates for use in the present invention may include but are not limited to isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI); mixed aralkyl diisocyanates such as tetramethylxylyl diisocyanates, OCN—C(CH$_3$)$_2$—C$_6$H$_4$C(CH$_3$)$_2$—NCO; polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate; and mixtures thereof.

Non-limiting examples of aromatic isocyanates for use in the present invention may include but are not limited to phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylene-interrupted aromatic diisocyanates such as methylenediphenyl diisocyanate, 4,4'-isomer (MDI) including alkylated analogs such as 3,3'-dimethyl-4,4'-diphenylmethane diisocyanate, polymeric methylenediphenyl diisocyanate and mixtures thereof.

In a non-limiting embodiment, polyisocyanate monomer may be used. It is believed that the use of a polyisocyanate monomer (i.e., residual-free monomer from the preparation of prepolymer) may decrease the viscosity of the polyurea composition thereby improving its flowability, and may provide improved adhesion of the polyurea coating to a previously applied coating and/or to an uncoated substrate. For example, the coatings that have been previously applied to a substrate can comprise functional groups (e.g. hydroxy groups) that are reactive with isocyanates, thereby enhancing adhesion of this coating to the polyurea composition of the present invention applied over this coating. A lower viscosity polyurea composition may also remain in a "flowable" state for a longer period of time as compared to a comparable composition having a higher viscosity. In alternate embodiments of the present invention, at least 1 percent by weight, or at least 2 percent by weight, or at least 4 percent by weight of the isocyanate component comprises at least one polyisocyanate monomer.

In a further embodiment of the invention, the isocyanate can include oligomeric polyisocyanates including but not limited to dimers, such as the uretdione of 1,6-hexamethylene diisocyanate, trimers, such as the biuret and isocyanurate of 1,6-hexanediisocyanate and the isocyanurate of isophorone diisocyanate, and polymeric oligomers. Modified polyisocyanates can also be used, including but not limited to carbodiimides and uretdiones, and mixtures thereof. Suitable materials include, without limitation, those available under the designation DESMODUR from Bayer Corporation of Pittsburgh, Pa. and include DESMODUR N 3200, DESMODUR N 3300, DESMODUR N 3400, DESMODUR XP 2410, and DESMODUR XP 2580.

As used herein, "isocyanate prepolymer" means polyisocyanate that is pre-reacted with polyamine or another isocyanate reactive group such as polyol. Suitable polyisocyanates include those previously disclosed herein. Suitable polyamines are numerous and may be selected from a wide variety known in the art. Examples of suitable polyamines include but are not limited to primary and secondary amines, and mixtures thereof, such as any of those listed herein. Amine terminated polyureas may also be used. Amines comprising tertiary amine functionality can be used provided that the amine further comprises at least two primary and/or secondary amino groups. Suitable polyols are numerous and may be selected from a wide variety known in the art. Examples of suitable polyols include but are not limited to polyether polyols, polyester polyols, polyurea polyols (e.g. the Michael reaction product of an amino function polyurea with a hydroxyl functional (meth)acrylate), polycaprolactone polyols, polycarbonate polyols, polyurethane polyols, poly vinyl alcohols, addition polymers of unsaturated monomers with pendant hydroxyl groups such as those containing hydroxy functional (meth)acrylates, allyl alcohols and mixtures thereof.

In certain embodiments, the isocyanate includes an isocyanate prepolymer and in other embodiments the isocyanate includes an isocyanate prepolymer and one or more additional isocyanates, such as one or more of the polyisocyanates described above.

As noted above, the polyurea of the present compositions is formed from a reaction mixture comprising isocyanate and the reaction product of a polyamine, a poly(meth)acrylate and either a mono(meth)acrylate or monoamine. As used herein and as will be understood by one skilled in the art the term "(meth)acrylate" denotes both the acrylate and the corresponding (meth)acrylate; "(meth)acrylate" is sometimes used herein to refer to the poly(meth)acrylate and/or the mono(meth)acrylate, depending on the context. The (meth)acrylate can be any suitable mono or poly(meth)acrylate and mixtures thereof. In certain embodiments the poly(meth)acrylate comprises di(meth)acrylate, in certain embodiments the poly(meth)acrylate comprises tri(meth)acrylate, and in certain embodiments the poly(meth)acrylate comprises tetra(meth)acrylate. Suitable mono(meth)acrylates include those having the formula:

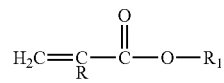

wherein R is H or methyl and $R_1$ may be, without limitation, alkyl or hydroxyalkyl, such as methyl, ethyl, 2-hydroxyethyl, 1-methyl-2-hydroxyethyl, 2-hydroxypropyl, propyl, isopropyl, n-butyl, 2-hydroxybutyl, 4-hydroxybutyl, isobutyl, sec-butyl, tert-butyl, hexyl, 2-ethylhexyl, cyclohexyl, methylcyclohexyl, trimethylcyclohexyl, isobornyl, lauryl, stearyl and the like. Non-limiting examples of mono(meth)acrylates include methyl(meth)acrylate, ethyl(meth)acrylate, propyl (meth)acrylate, butyl(meth)acrylate, isobutyl(meth)acrylate, sec-butyl(meth)acrylate, tert-butyl(meth)acrylate, cyclohexyl(meth)acrylate, 2-ethylhexyl(meth)acrylate, isooctyl (meth)acrylate, isodecyl(meth)acrylate, lauryl(meth)acrylate, stearyl(meth)acrylate, isobornyl(meth)acrylate, hydroxyethyl(meth)acrylate, hydroxypropyl(meth)acrylate, 2-hydroxybutyl(meth)acrylate, 4-hydroxybutyl(meth)acrylate, and adducts of hydroxy(meth)acrylates with lactones such as the adducts of hydroxyethyl(meth)acrylate with ε-caprolactone. Suitable di(meth)acrylates include, but are not limited to, ethylene glycol di(meth)acrylate, 1,3-butylene glycol di(meth)acrylate, 1,4-butanediol di(meth)acrylate, 2,3-dimethylpropane 1,3-di(meth)acrylate, 1,6-hexanediol di(meth)acrylate, propylene glycol di(meth)acrylate, dipropylene glycol di(meth)acrylate, tripropylene glycol di(meth)acrylate, tetraethylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, polybutadiene di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxyolated neopentyl glycol di(meth)acrylate, pentanediol di(meth)acrylate, cyclohexane dimethanol di(meth)acrylate, ethoxylated bis-phenol A di(meth)acrylate, and mixtures thereof. Non-limiting examples of tri and higher (meth)acrylates may include glycerol tri(meth)acrylate, trimethylolpropane tri(meth)acrylate, ethoxylated trimethylolpropane tri(meth)acrylate, propoxylated trimethylolpropane tri(meth)acrylate, ditrimethylolpropane tetra(meth)acrylate, pentaerythritol tetra(meth)acrylate, ethoxylated pentaerythritol tetra(meth)acrylate, propoxylated pentaerythritol tetra(meth)acrylate, and dipentaerythritol penta(meth)acrylate. Other suitable (meth)acrylate oligomers include (meth)acrylate of epoxidized soya oil and urethane acrylates of polyisocyanates and hydroxyalkyl (meth)acrylates. Mixtures of (meth)acrylate monomers may also be used, including mixtures of mono, di, tri, and/or tetra(meth)acrylate.

Other suitable poly(meth)acrylates include urethane (meth)acrylates such as those formed from the reaction of a hydroxyl functional (meth)acrylate with a polyisocyanate or with an NCO functional adduct of a polyisocyanate and a polyol or a polyamine. Suitable hydroxyl functional (meth) acrylates include any of those listed herein. Suitable polyisocyanates include, without limitation, any of the monomeric or oligomeric isocyanates, or isocyanate prepolymers listed herein.

Suitable polyamines for use in the amine/(meth)acrylate oligomeric reaction product of the present invention can be selected from a wide variety of known primary polyamines, and mixtures thereof including polyamines having at least two functional groups, such as di-, tri-, or higher functional polyamines and mixtures thereof. In certain embodiments, the polyamine/(meth)acrylate reaction product further includes a monoamine. The amine or amines used may be aromatic or aliphatic, such as cycloaliphatic, or mixtures thereof. Examples of suitable aliphatic mono and polyamines include but are not limited to ethylamine, isomeric propylamines, butylamines (e.g. butylamine, isobutylamine, sec-butylamine, and tert-butylamine), pentylamines, hexylamines, cyclohexylamine, ethylene diamine, 1,2-diaminopropane, 1,4-diaminobutane, 1,3-diaminopentane (DYTEK EP, Invista), 1,6-diaminohexane, 2-methyl-1,5-pentane diamine (DYTEK A, Invista), 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'-diaminodicyclohexyl methane, 4,4'-diaminodicyclohexyl methane (PACM-20, Air Products) and 3,3'-dialkyl-4,4'-diaminodicyclohexyl methanes (such as 3,3'-dimethyl-4,4'-diaminodicyclohexyl methane (DIMETHYL DICYKAN or LAROMIN C260, BASF; ANCAMINE 2049, Air Products) and 3,3'-diethyl-4,4'-diaminodicyclohexyl methane), 2,4- and/or 2,6-diaminotoluene and 2,4'- and/or 4,4'-diaminodiphenyl methane, or mixtures thereof. Additional suitable amines include but are not limited to 2-ethylhexylamine, octylamine, tert-octylamine, dodecylamine, octadecylamine, 3-(cyclohexylamine)propylamine, 3,3'-[1,4-butanediylbis]-1-propanamine, and diamino functional polyetheramines having aliphatically bound primary amino groups, examples of which include JEFFAMINE D-230, JEFFAMINE D-400, JEFFAMINE D-2000, and JEFFAMINE D-4000 available from Huntsman Corporation. It will be appreciated that when the amine is hindered, the reaction time between the (meth)acrylated amine and the isocyanate will be slower. This gives a longer pot-life or work-processing time in those situations where a longer processing time is desired.

In certain embodiments the polyamine is a triamine. Examples of suitable triamines include dipropylene triamine, bis(hexamethylene) triamine and triamino functional polyetherpolyamines having aliphatically bound primary amino groups (JEFFAMINE T-403, JEFFAMINE T-3000, JEFFAMINE T-5000 from Huntsman Corporation.) In other embodiments the amine can be a tetraamine or other higher functional amine.

In certain specific embodiments of the present invention, the polyamine comprises 4,4'-diaminodicyclohexyl methane. In certain other specific embodiments, the polyamine comprises 3,3'-dimethyl-4,4'-diaminodicyclohexyl methane. In certain other specific embodiments, the polyamine comprises isophorone diamine ("IPDA"). These polyamines can be reacted, for example, with any of the (meth)acrylates listed herein.

As noted above, in certain embodiments, a monoamine is used in conjunction with a polyamine. Suitable monoamines include but are not limited to primary amines of the formula $R_2-NH_2$, where $R_2$ is a hydrocarbon radical that may represent a straight chain or branched alkyl group, an aryl-alkyl group, a hydroxyalkyl group or an alkoxyalkyl group.

The polyamine, poly(meth)acrylate and mono(meth)acrylate or monoamine can be reacted in any ratio to give a suitable product. In certain embodiments, the equivalent ratio of amine to (meth)acrylate is substantially stoichiometric. In other embodiments, a slight excess of amine (such as an equivalent ratio of amine to (meth)acrylate of up to 1.05, or less than 1.03, to 1) can be used to ensure that the (meth)acrylate groups are essentially consumed or to leave some unreacted primary amine. In certain embodiments the reaction product is substantially free of unreacted primary amino groups. Minimizing the amount of residual primary amine in the (meth)acrylated amine slows its rate of reaction with isocyanate; thus, the ratio of amine to (meth)acrylate can be varied depending on the level of reactivity desired in the resulting (meth)acrylated amine. Accordingly, in certain other embodiments, an excess of amine to (meth)acrylate can be used to alter the cure speed in the subsequent polyurea composition.

In certain other embodiments, both mono(meth)acrylates and poly(meth)acrylates can be reacted with polyamines. The poly(meth)acrylates, polyamines, and mono(meth)acrylates can be as described above. In particularly suitable embodiments, the poly(meth)acrylate comprises 1,6-hexanediol diacrylate, the polyamine comprises 3,3'-dimethyl-4,4'-diaminodicyclohexyl methane, and the mono(meth)acrylate comprises methyl acrylate. In other particularly suitable embodiments, the poly(meth)acrylate comprises 1,6-hexanediol diacrylate, the polyamine comprises IPDA, and the mono(meth)acrylate comprises butyl acrylate.

The equivalent ratio of poly(meth)acrylate to amine to mono(meth)acrylate can be any suitable ratio to give the desired properties to the polyamine/(meth)acrylate reaction product. For example, when the poly(meth)acrylate comprises a di(meth)acrylate, the equivalent ratio of poly(meth)acrylate:amine:mono(meth)acrylate can range from 0.9:1.05:0.1 to 0.1:1.05:0.9, such as 0.30:1:0.65; 2:3:1; 1:2:1; or 1:3:2. When the poly(meth)acrylate comprises a tri(meth)acrylate, the equivalent ratio of tri(meth)acrylate:amine:mono(meth)acrylate can range from 1:3:2 or 1:2:1. It will be appreciated that these ratios are just examples, and that any other suitable ratio can be used according to the present invention.

The amine/(meth)acrylate oligomeric reaction product used in the present invention can be formed, for example, in the manner described in the examples, or any other suitable manner. When both a mono(meth)acrylate and poly(meth)acrylate are used, the poly(meth)acrylate and polyamine can be reacted first, and then reacted with a mono(meth)acrylate in sequential steps, or the polyamine can be reacted with the poly(meth)acrylate and mono(meth)acrylate simultaneously. The equivalent ratio of amine:(meth)acrylate and/or polyacrylate:amine:monoacrylate can be any of those described above or any other suitable ratio.

In another embodiment of the invention, both a monoamine and a polyamine can be reacted with the poly(meth)acrylate. The poly(meth)acrylate, polyamine, and monoamine can be, without limitation and in any combination, as listed above. In an embodiment, polyamine can be reacted sequentially first with poly(meth)acrylate and then with monoamine. In another embodiment, polyamine, monoamine, and poly(meth)acrylate can be reacted together in one step. Monoamine, polyamine and (meth)acrylate can be reacted in any ratio to give a suitable product. In certain embodiments, the equivalent ratio of monoamine and polyamine (total amine) to poly(meth)acrylate is substantially stoichiometric. In other embodiments, a slight excess of amine (such as an equivalent ratio of amine to poly(meth)acrylate of up to 1.05, or less than 1.03, to 1) can be used to ensure that conversion of the (meth)acrylate groups is essentially quantitative. In certain other embodiments, a larger excess of amine to (meth)acrylate can be used. As discussed above, the amount of amine used in relation to the amount of poly(meth)acrylate can be altered to affect the reaction rate between the (meth)acrylated amine and the isocyanate as desired by the user.

The amine/(meth)acrylate oligomeric reaction product used according to the present invention can be the result of the reaction of any combination of mono and polyamines and mono and poly(meth)acrylates, within the parameters described herein. Certain embodiments of the present invention specifically exclude a polyurethane acrylate and/or a polyurethane acrylate prepolymer from the amine/(meth) acrylate oligomeric reaction product.

The present polyurea compositions may comprise more than one amine/(meth)acrylate oligomeric reaction product as described herein or one or more other amine curatives in addition to the amine/(meth)acrylate oligomeric reaction product(s). For example, the present polyurea compositions may comprise one or more amines that are the reaction product of an amine, a (meth)acrylate and a dialkyl maleate and/or dialkyl fumarate, such as those described in the U.S. patent application entitled: "(Meth)Acrylate/Aspartate Amine Curatives and Coatings and Articles Comprising the Same" filed on even date herewith and hereby incorporated by reference; one or more amines that are the reaction product of a polyamine and a mono(meth)acrylate, such as those described in the U.S. patent application entitled: "Polyurea Coating Comprising a Polyamine/Mono(Meth)Acrylate Reaction Product" filed on even date herewith and hereby incorporated by reference; one or more amines that are the reaction product of a monoamine and a (meth)acrylate, such as those described in the U.S. patent application entitled: "Substrates Coated with a Polyurea Comprising a (Meth) Acrylated Amine Reaction Product" filed on even date herewith and hereby incorporated by reference; and/or one or more amines that are the reaction product of a triamine and a dialkyl maleate and/or dialkyl fumarate, such as those described in the U.S. patent application entitled: "Tiamine/Aspartate Curative and Coatings comprising the Same" filed on even date herewith and hereby incorporated by reference.

The polyurea comprising the present amine/(meth)acrylate curative and an isocyanate can additionally include other amines such as those known in the art including but not limited to any polyamines or combinations thereof listed herein. Other amines include secondary cycloaliphatic diamines such as JEFFLINK 754 (Huntsman Corporation, Houston, Tex.) and CLEARLINK 1000 (Dorf-Ketal Chemicals, LLC), aspartic ester functional amines, such as those available under the name DESMOPHEN such as DESMOPHEN NH1220, DESMOPHEN NH 1420, and DESMOPHEN NH 1520 (Bayer Corporation), other aspartic ester functional materials, such as the reaction products of triamines that comprise at least one secondary amino group prior to reaction with a dialkyl maleate and/or dialkyl fumarate including but not limited to the reaction products of diethylene triamine, dipropylene triamine, and bis-hexamethylene triamine with a dialkyl maleate and/or dialkyl fumarate; examples of such materials include the adduct of dipropylene triamine and diethyl maleate, the adduct of dipropylene triamine and dibutyl maleate, the adduct of bis-hexamethylene triamine with diethyl maleate, and the adduct of bis-hexamethylene triamine with dibutyl maleate. Polyoxyalkyleneamines are also suitable. Polyoxyalkyleneamines comprise two of more primary or secondary amino groups attached to a backbone, derived, for example, from propylene oxide, ethylene oxide, butylene oxide or a mixture thereof. Examples of such amines include those available under the designation JEFFAMINE, such as, without limitation, JEFFAMINE D-230, D-400, D-2000, HK-511, ED-600, ED-900, ED-2003, T-403, T-3000, T-5000, SD-231, SD-401, SD-2001, and ST-404 (Huntsman Corporation). Such amines have an approximate molecular weight ranging from 200 to 7500. When more than one amine/(meth)acrylate oligomeric reaction product and/or amine/(meth)acrylate/aspartate reaction product is used, each (meth)acrylate, amine and/or dialkyl maleate and/or dialkyl fumarate can be the same or different.

Other suitable secondary amines that can be included in the present composition are reaction products of materials comprising primary amine functionality with acrylonitrile. Suitable amines include any polyamine listed herein comprising primary amino functionality. One example of such a material is the adduct of 4,4'-diaminodicyclohexylmethane and acrylonitrile. An example of a commercially available material is the adduct of isophorone diamine and acrylonitrile sold under the designation POLYCLEAR 136, (Hansen Group LLC).

Other amines that can be used are adducts of primary polyamines with mono or polyepoxies; an example of such a material is the adduct of isophorone diamine with CARDURA E10P (available from Hexion Speciality Chemicals, Inc).

In certain embodiments, the amine component of the polyurea, and/or the polyurea itself, are substantially free of primary amine functionality (unreacted primary amino groups). "Substantially free of primary amine functionality" and like terms means that theoretically there is no primary amine functionality but there maybe some primary amine functionality present that is purely incidental, i.e. impurities in amines that are otherwise secondary amine functional and/or trace primary amine functionality that did not react.

In an embodiment, the coating compositions of the present invention may include a blend of polyurea and polyurethane. As used herein, therefore, "polyurea" includes both polyurea and blends of polyurea and polyurethane. It will be appreciated by those skilled in the art that polyurethane can be formed as a by-product in the reactions of the present invention. In alternate embodiments, the polyurethane can be formed in-situ and/or it can be added to the reaction mixture; a non-limiting example is an NCO functional prepolymer formed by reaction of a polyol and a polyisocyanate as disclosed herein. A non-limiting example of polyurethane formed in-situ may include the reaction product of polyisocyanate and hydroxyl-functional material. Non-limiting examples of suitable polyisocyanates may include those described herein. Non-limiting examples of suitable hydroxyl-functional material may include polyols such as those described herein. Another example of polyurethane formed in-situ may include the reaction product of hydroxyl functional prepolymer and isocyanate-functional material. Suitable examples of these reactants may include those described herein.

The polyurea coating composition of the present invention may be formulated and applied using various techniques known in the art. Accordingly, the present invention is further directed to methods for coating a substrate comprising applying to at least a portion of the substrate any of the coating compositions described herein. In an embodiment, conventional spraying techniques may be used. In this embodiment, the isocyanate and amine may be combined such that the ratio of equivalents of isocyanate groups to equivalents of amine groups is greater than 1 and the isocyanate and amine can be applied to a substrate at a volume mixing ratio of 1:1; the reaction mixture may be applied to an uncoated or coated substrate to form a first coating on the uncoated substrate or a subsequent coating on the coated substrate. When determining the ratio of equivalents of isocyanate groups to equivalents of reactive amine groups, the total amine groups are taken into consideration, that is the amine groups from the amine/(meth)acrylate curative as well as any other amine used in the coating.

It will be appreciated that the present compositions are two component or "2K" compositions, wherein the isocyanate-containing component and the amine-containing component are kept separate until just prior to application. Such compositions will be understood as curing under ambient conditions, although a heated forced air or a heat cure can be applied to accelerate final cure or to enhance coating properties such as adhesion. In an embodiment, the sprayable coating composition may be prepared using a two-component mixing device. In this embodiment, isocyanate and amine are added to a high pressure impingement mixing device. The isocyanate is added to the "A-side" and amine is added to the "B-side". The A- and B-side streams are impinged upon each other and immediately sprayed onto at least a portion of an uncoated or coated substrate. The isocyanate and the amine react to produce a coating composition that is cured upon application to the uncoated or coated substrate. The A- and/or B-side can also be heated prior to application, such as to a temperature of 140° F. Heating may promote a better viscosity match between the two components and thus better mixing, but is not necessary for the curing reaction to occur.

It is believed that the ratio of equivalents of isocyanate groups to amine groups may be selected to control the rate of cure of the coating composition of the present invention. It has been found that cure and adhesion advantages may result when applying the coating in a 1:1 volume ratio wherein the ratio of the equivalents of isocyanate groups to amine groups (also known as the reaction index) is greater than one, such as from 1.01 to 1.10:1, or from 1.03 to 1.10:1, or from 1.05 to 1.08:1 or from 1.01 to 1.4 to 1 or from 1.01 to 1.5, or greater than 1.3 to 1. For example, good adhesion can be obtained using these ratios over clearcoats that have low surface functionality after cure, such as carbamate melamine, hydroxyl melamine, 2K urethane, and silane-containing clearcoats. The term "1:1 volume ratio" means that the volume ratio varies by up to 20% for each component, or up to 10% or up to 5%.

In a non-limiting embodiment, a commercially available mixing device available commercially under the designation GUSMER VR-H-3000 proportioner fitted with a GUSMER Model GX-7 spray gun may be used. In this device, pressurized streams of the A- and B-side components are delivered from two separate chambers and are impacted or impinged upon each other at high velocity to mix the two components and form a coating composition, which may be applied to an uncoated or coated substrate using the spray gun. The mixing forces experienced by the component streams may be depend upon the volume of each stream entering the mixing chamber per unit time and the pressure at which the component streams are delivered. A 1:1 volume ratio of the isocyanate and amine per unit time may equalize these forces.

Another suitable application device known in the industry includes a "static mix tube" applicator. In this device, the isocyanate and amine are each stored in a separate chamber. As pressure is applied, each of the components is brought into a mixing tube in a 1:1 ratio by volume. Mixing of the components is effected by way of a torturous or cork screw pathway within the tube. The exit end of the tube may have atomization capability useful in spray application of the reaction mixture. Alternatively, the fluid reaction mixture may be applied to a substrate as a bead. A static mix tube applicator is commercially available from Cammda Corporation.

The polyurea coating compositions of the present invention may be applied to a wide variety of substrates. Accordingly, the present invention is further directed to a substrate coated with any of the composition described herein. Non-limiting examples of suitable substrates can include but are not limited to metal, natural and/or synthetic stone, ceramic, glass, brick, cement, concrete, cinderblock, wood and composites and laminates thereof; wallboard, drywall, sheetrock, cement board, plastic, paper, PVC, styrofoam, plastic composites, acrylic composites, ballistic composites, asphalt, fiberglass, soil, gravel and the like. Metals can include but are not limited to aluminum, cold rolled steel, electrogalvanized steel, hot dipped galvanized steel, titanium and alloys; plastics can include but are not limited to TPO, SMC, TPU, polypropylene, polycarbonate, polyethylene, polyamides (Nylon). The substrates can be primed metal and/or plastic; that is, an organic or inorganic layer is applied thereto. Further, the coating compositions of the present invention can be applied to said substrates to impart one or more of a wide variety of properties such as but not limited to corrosion resistance, abrasion resistance, impact damage, flame and/or heat resistance, chemical resistance, UV light resistance, structural integrity, ballistic mitigation, blast mitigation, sound dampening, decoration and the like. In non-limiting examples, the coating compositions of the present invention can be applied to at least a portion of a building structure or an article of manufacture such as but not limited to a vehicle. "Vehicle" includes but is not limited to civilian, commercial, and military land-, water-, and air-vehicles, for example, cars, trucks, boats, ships, submarines, airplanes, helicopters, humvees and tanks. The article of manufacture can be a building structure. "Building structure" includes but is not limited to at least a portion of a structure including residential, commercial and military structures, for example, roofs, floors, support beams, walls and the like. As used herein, the term "substrate" may refer to a surface, either external or internal, on at least a portion of an article of manufacture or the article of manufacture itself. In an embodiment, the substrate is a truck bed.

In an embodiment, the polyurea coating composition of the present invention may be applied to a carrier film. The carrier film can be selected from a wide variety of such materials known in the art. Non-limiting examples of suitable carrier films may include, but are not limited to thermoplastic materials, thermosetting materials, metal foils, cellulosic paper, synthetic papers, and mixtures thereof. As used herein, the term "thermoplastic material" refers to any material that is capable of softening or fusing when heated and of solidifying (hardening) again when cooled. Non-limiting examples of suitable thermoplastic materials may include polyolefins, polyurethanes, polyesters, polyamides, polyureas, acrylics, and mixtures thereof. As used herein, the term "thermosetting material" refers to any material that becomes permanently rigid after being heated and/or cured. Non-limiting examples may include polyurethane polymers, polyester polymers, polyamide polymers, polyurea polymers, polycarbonate polymers, acrylic polymers, aminoplasts, isocyanates, epoxies, copolymers thereof, and mixtures thereof.

As noted above, in certain embodiments, the polyurea coating compositions of the present invention may be applied to a bare (e.g., untreated, uncoated) substrate, a pretreated substrate and/or coated substrate having at least one other coating. In a non-limiting embodiment, the coating compositions of the present invention may be applied as part of a multi-layer coating composite. The first coating applied to a substrate may be selected from a variety of coating compositions known in the art for surface coating substrates. Non-limiting examples may include but are not limited to electrodepositable film-forming compositions, primer compositions, pigmented or non-pigmented monocoat compositions, pigmented or non-pigmented base coat compositions, transparent topcoat compositions, industrial coating compositions, and the like. In another non-limiting embodiment, the coating compositions of the present invention may be applied as part of a multi-layer coating composite comprising a pretreated substrate and coating layers such as but not limited to electrocoat, primer, base coat, clear coat, and combinations thereof. In an embodiment, the clear coat comprises silane functional groups either before or after crosslinking and cure.

In a further embodiment, the polyurea coating compositions of the present invention can be used in a two-coat application resulting in a textured surface. A first coat is applied to an uncoated or coated substrate to produce a smooth, substantially tack-free layer. The "Tack-Free Method" is used to determine if the layer is substantially tack-free. The Tack-Free Method includes spraying the coating composition in one coat onto a non-adhering plastic sheet to a thickness of from 10 to 15 mil (254-381 microns). When spraying is complete, an operator, using a loose fitting, disposable vinyl glove, such as one commercially available as AMBIDEX Disposable Vinyl Glove by Marigold Industrial, Norcross Ga., gently touches the surface of the coating. The coating may be touched more than one time by using a different fingertip. When the glove tip no longer sticks to, or must be pulled from, the surface of the layer, the layer is said to be substantially tack-free. The time beginning from the completion of spraying until when the coating is substantially tack-free is said to be the tack-free time. In a non-limiting embodiment, the tack-free time and the cure time may be controlled by balancing levels of various composition components such as the ratio of primary amine to secondary amine.

A second coat may then be applied to the first coating layer as a texturizing layer or "dust coating". The second coating layer can be applied by increasing the distance between the application/mixing device and the coated substrate to form discrete droplets of the coating composition prior to contacting the coated substrate thereby forming controlled non-uniformity in the surface of the second layer. The substantially tack-free first layer of the coating is at least partially resistant to the second layer; i.e., at least partially resistant to coalescence of the droplets of coating composition sprayed thereon as the second layer or dust coating such that the droplets adhere to but do not coalesce with the previous layer(s) to create surface texture. The final coating layer typically exhibits more surface texture than the first or previous coating layers. An overall thickness of the coating layers may range from 20 to 1000 mils, or from 40 to 150 mils, or from 60 to 100 mils (1524-2540 microns), or from 500 to 750 mils. In a non-limiting embodiment, the first layer may be the majority of the total thickness and the dust coating may be from 15-50 mils (381-1270 microns).

In various embodiments of the present invention, the "first" coating layer may comprise one, two, three or more layers; and the "second" coating layer may be one or more subsequent layers applied thereover. For example, four polyurea layers may be applied, with the fourth layer being the dust coating and each layer having a thickness of from 15 to 25 mil (381-635 microns). It will be appreciated that these coating layers are relatively "thick". The coating compositions of the present invention can also be applied as much thinner layers as well, such as 0.1 to less the 15 mils, such as 0.1 to 10, 0.5 to 3 or 1 to 2 mils. Such layers can be used alone or in conjunction with other coating layers, such as any of those known in the art or otherwise described herein. When applied at a sufficient thickness (e.g. 10 to 1000 mils, such as 100 to 200 mils, or 125 mils+/−10 mils), the present polyurea layer(s) can provide blast mitigation. "Blast mitigation" means, for example, protection in the event of a close proximity blast or explosion. This protection can include, for example, protection of a structure or portion of a structure, such as a building structure, vehicle, aircraft, ship/boat, shipping container and the like, from collapse and/or destruction, protection against flying debris and blast fragments, and the like.

In alternate embodiments, the coating layers may comprise the same or different polyurea coating compositions. For example, the first layer may be a polyurea composition comprising aliphatic and/or aromatic amine components and/or aliphatic and/or aromatic polyisocyanate and the second layer may comprise the same or different combination of aliphatic and/or aromatic amine components and/or aliphatic and/or aromatic polyisocyanate. "Amine component" in this context means any amine used in the present coatings. In a further embodiment, the outermost coating layer may comprise a coating composition that provides a desired durability. The desired durability may depend upon the use of the coating composition of the present invention and/or the substrate to which it may be applied. In an embodiment, a combination of aliphatic and/or aromatic amine and/or polyisocyanate may be selected such that the composition of the outermost layer has substantial durability. For example, the outermost coating layer may have a durability of 1000 kJ to 6000 kJ, or from 800 hours to 4000 hours, when tested using a Weatherometer (Atlas Material Testing Solutions) in accordance with method SAE J1960. In this embodiment, the first layer may be a polyurea composition comprising polyisocyanate and amine, wherein at least one of the amine and/or polyisocyanate may comprise an aromatic moiety, and the second layer may be a polyurea composition comprising predominantly aliphatic amine and aliphatic polyisocyanate, with little or no aromaticity.

The polyurea coating compositions of the present invention may optionally include materials standard in the art such as but not limited to fillers, fiberglass, stabilizers, thickeners, fillers, adhesion promoters, catalysts, colorants, antioxidants, UV absorbers, hindered amine light stabilizers, rheology modifiers, flow additives, anti-static agents and other performance or property modifiers that are well known in the art of surface coatings, and mixtures thereof. For example, the present coatings can further comprise flame and/or heat resistant material, such as any one or more of those disclosed in U.S. application Ser. No. 11/591,312, hereby incorporated by reference in its entirety. Fillers can include clay and/or silica, and adhesion promoters can include amine functional materials, aminosilanes and the like; examples of fillers and adhesion promoters are further described in U.S. Publication No. 2006/0046068, hereby incorporated by reference in its entirety. These additives can be combined with the isocyanate, the amine/(meth)acrylate oligomeric reaction product, or both. In certain embodiments, the coating may further comprise small amounts of solvent and in certain embodiments the coating may be substantially solvent-free. "Substantially solvent-free" means that the coating may contain a small amount of solvent, such as 5%, 2%, 1% or less.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art. The grind vehicle can also comprise the (meth) acrylated amine of the present invention either in total or in combination with any other amines and polyols as described herein.

Example pigments and/or pigment compositions include, but are not limited to, carbazole dioxazine crude pigment, azo, monoazo, disazo, naphthol AS, salt type (lakes), benzimidazolone, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the polyurea coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity, or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 0.1 to 65 weight percent of the present compositions, such as from 3 to 40 weight percent or 5 to 35 weight percent, with weight percent based on the total weight of the compositions. In certain embodiments, the weight percent of pigment may be 0.1 to 1.0 weight percent.

In another embodiment, the polyurea coating compositions of the present invention when applied to a substrate possesses color that matches the color of an associated substrate. As used herein, the term "matches" or like terms when referring to color matching means that the color of the coating composition of the present invention substantially corresponds to a desired color or the color of an associated substrate. For instance, when the substrate for the polyurea coating composition is a portion of a vehicle, such as a truck bed, the color of the coating substantially matches that of the associated vehicle body. This can be visually observed, or confirmed using spectroscopy equipment.

The coatings of the present invention may be part of a multi-layer coating composite comprising a substrate with various coating layers such as a pretreatment layer, electrocoat, primer, base coat and clear coat. At least one of the base coat and clear coat may contain pigment and/or the clear coat may contain an adhesion promoter and any of these coatings can be the coatings described herein. It is believed that the addition of adhesion promoter to the clear coat, or to its surface, may improve the adhesion between the clear coat and the coating composition applied thereover, although the inventors do not wish to be bound by any mechanism. In this embodiment, the coating composition of the present invention may be the reaction product of isocyanate and the acrylated amine with a pigment additive. The coating composition of the present invention containing pigment may be applied to at least a portion of the article or structure. The color of the coated article or structure may match the color of an associated substrate. An "associated substrate" may refer to a substrate that comprises the article or structure but is not coated with the coating composition of the present invention or a substrate that is attached, connected or in close proximity to the article or structure, but is not coated with the coating composition of the present invention.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while the invention has been described herein including the claims in terms of "a" polyurea, "an" isocyanate, "a" polyamine, "a" poly(meth)acrylate, "a" monoamine, "a" mono(meth)acrylate, "an" amine/(meth)acrylate oligomeric reaction product and the like, mixtures of all of such things can be used. Also, as used herein, the term "polymer" is meant to refer to prepolymers, oligomers and both homopolymers and copolymers; the prefix "poly" refers to two or more.

EXAMPLES

The following examples are intended to illustrate the invention, and should not be construed as limiting the invention in any way. As will be appreciated by those skilled in the art MW refers to average molecular weight, $M_w$ refers to weight average molecular weight and $M_n$ refers to number average molecular weight.

Example A

An oligomeric amine/acrylate curative was prepared from the following ingredients:

| Ingredient | Wt in g |
| --- | --- |
| Charge 1 | |
| Isophorone diamine | 172.5 |
| 4,4'-diaminodicyclohexylmethane | 71.0 |
| 2,6-tert-butyl p-cresol | 0.5 |
| Charge 2 | |
| 1,6-hexanediol diacrylate | 152.6 |
| Charge 3 | |
| Butyl acrylate | 167.6 |

Charge 1 was added to a suitable reactor equipped with an overhead stirrer, thermocouple, condenser, and $N_2$ inlet. The charge was placed under an $N_2$ blanket. Beginning at a temperature of 22° C., Charge 2 was added to the reactor over a period of 35 minutes. A mild exotherm was observed during the addition. An ice bath was applied to the flask 9 minutes into the addition at a temperature of 32° C. At the completion of the addition, the temperature of the reaction mixture was 28° C. The contents of the reactor were heated to 60° C. with an external heat source and held at this temperature for 8.25 hours. Inspection of the infrared spectrum of the reaction mixture indicated the consumption of 1,6-hexanediol diacrylate (peaks at 1621, 1635 cm−1). The temperature of the reaction mixture was raised to 70° C. and Charge 3 was added to the reaction mixture over 35 minutes. The temperature of the reaction mixture at the completion of this addition was 70° C.; the temperature of the reaction mixture was raised to 80° C. and held for 4.6 hours. Inspection of the infrared spectrum at this time indicated consumption of butyl acrylate. The resulting material was found to have a measured solids content of (110° C., 1 hr) of 99.0 percent, a viscosity of Z on the Gardner-Holt scale, a density of 8.38 lb/gal, a total amine content of 4.758 meq/g, a residual primary amine content of 0.243 meq/g, a secondary amine content of 4.437 meq/g, a tertiary amine content of 0.078 meq/g, and a $M_w$ of 1657 and a $M_n$ of 544 as determined by gel permeation chromatography vs. a polystyrene standard.

Example B

An oligomeric amine/acrylate curative was prepared from the following ingredients:

| Ingredient | Wt in g |
| --- | --- |
| Charge 1 | |
| Isophorone diamine | 191.7 |
| 4,4'-diaminodicyclohexylmethane | 78.9 |
| 2,6-tert-butyl p-cresol | 0.6 |
| Charge 2 | |
| Trimethylolpropane triacrylate | 98.7 |
| Charge 3 | |
| Butyl acrylate | 248.3 |

Charge 1 was added to a suitable reactor equipped with an overhead stirrer, thermocouple, condenser, and $N_2$ inlet. The charge was placed under an $N_2$ blanket. Beginning at a temperature of 25° C., Charge 2 was added to the reactor over a period of 40 minutes. A mild exotherm was observed during the addition. An ice bath was applied to the flask 10 minutes into the addition at a temperature of 32° C. At the completion of the addition, the temperature of the reaction mixture was 30° C. The contents of the reactor were heated to 60° C. with an external heat source and held for 6.6 hours. Inspection of the infrared spectrum of the reaction mixture indicated the consumption of trimethylolpropane triacrylate (peaks at 1621, 1635 cm−1). The temperature of the reaction mixture was raised to 70° C. and Charge 3 was added to the reaction mixture over 40 minutes. The temperature of the reaction mixture at the completion of this addition was 71° C.; the temperature of the reaction mixture was raised to 80° C. and held for 7.5 hours. Inspection of the infrared spectrum at this time indicated consumption of butyl acrylate. The resulting material was found to have a measured solids content of (110° C., 1 hr) of 98.5 percent, a density of 8.37 lb/gal, a viscosity of Z4 on the Gardner-Holt scale, a total amine content of 4.602 meq/g, a residual primary amine content of 0.137 meq/g, a secondary amine content of 4.366 meq/g, a tertiary amine content of 0.099 meq/g, and a $M_w$ of 621 and a $M_n$ of 401 as determined by gel permeation chromatography vs. a polystyrene standard.

Example C

An acrylate/aspartate amine curative was prepared from the following ingredients:

| Ingredient | Wt in g |
|---|---|
| Charge 1 | |
| Isophorone diamine | 2982.0 |
| 2,6-di-tert-butyl p-cresol | 3.5 |
| Charge 2 | |
| Dibutyl maleate | 1995.0 |
| Charge 3 | |
| 2,6-di-tert-butyl p-cresol | 3.5 |
| Charge 4 | |
| Butyl acrylate | 3270.4 |

Charge 1 was added to a suitable flask equipped with an overhead stirrer, thermocouple, condenser, and $N_2$ inlet. The charge was placed under an $N_2$ blanket. Beginning at a temperature of 21° C., Charge 2 was added to the flask over a period of 5.75 hours. A mild exotherm was observed during the addition. A maximum temperature of 35° C. was observed during the addition of this charge. At the completion of the charge, the temperature of the reaction mixture was 33° C. The reaction mixture was heated to a temperature of 35-37° C. with an external heat source and held at this temperature for 3 hours. Inspection of the infrared spectrum of the reaction mixture indicated consumption of dibutyl maleate (disappearance of peak at 1646 cm−1). Charge 3 was added to the reactor, and the reaction mixture heated to 43° C. Charge 4 was added to the reaction mixture for 3.6 hours; a mild exotherm was observed. The temperature range of the reaction mixture over the course of Charge 4 was between 43 and 50° C.; at the completion of Charge 4 the temperature was 45° C. The temperature of the reaction mixture was then raised to 50° C. and held for 3 hours. Inspection of the infrared spectrum of the reaction mixture indicated the presence of unreacted acrylate (peaks at 1621, 1635 cm−1). The temperature of the reaction mixture was raised to 70° C. and held for 10.9 hours. Inspection of the infrared spectrum of the reaction mixture indicated that the presence of the peaks attributed to the acrylate could not be distinguished from baseline noise; at this point the reaction was judged to be complete. The resulting material was found to have measured solids content (110° C., 1 hr) of 98.9 percent, a viscosity of D on the Gardner-Holt scale, a density of 8.17 lb/gal, a total amine content of 4.21 meq/g, a residual primary amine content of 0.230 meq/g, a secondary amine content of 3.985 meq/g, a tertiary amine content of 0.000 meq/g, and a $M_w$ of 450 and a $M_n$ of 406 as determined by gel permeation chromatography vs. a polystyrene standard.

Example D

A urethane acrylate/acrylate blend was prepared from the following ingredients:

| Ingredient | Wt in g |
|---|---|
| Charge 1 | |
| DESMODUR W[1] | 529.2 |
| Dibutyltin dilaurate | 0.8 |
| 2,6-di-tert-butyl p-cresol | 2.7 |
| Charge 2 | |
| Hydroxypropyl acrylate | 551.5 |
| Charge 3 | |
| Hydroxypropyl acrylate | 30.5 |
| Charge 4 | |
| 1,6-hexanediol diacrylate | 721.3 |

[1]Methylene bis(4-cyclohexylisocyanate), available from Bayer Corporation.

Charge 1 was added to a suitable reactor equipped with an overhead stirrer, thermocouple, condenser, and air inlet. The charge was placed under an air blanket. Beginning at a temperature of 72° C., Charge 2 was added to the reactor over a period of 1.4 hours over a temperature range of 69 to 80° C. The reaction was held for approximately 6 hours at this temperature. An infrared spectrum of the reaction mixture indicated the presence of isocyanate. Over the next 5.3 hours, Charge 3 was added to the reaction mixture in three portions and the temperature gradually increased to 90° C. The reaction mixture was held at 90° C. for an additional 6.9 hours. At this point, the infrared spectrum of the reaction mixture showed that the isocyanate was consumed and Charge 3 was added to the reaction mixture. The resulting mixture was found to have a viscosity of W- on the Gardner-Holt scale. Before the addition of Charge 3, the material was determined to have a $M_w$ or 656 and a $M_n$ of 589 as determined by gel permeation chromatography vs. a polystyrene standard.

Example E

An oligomeric amine/acrylate curative was prepared from the following ingredients:

| Ingredient | Wt in g |
|---|---|
| Charge 1 | |
| Urethane acrylate/acrylate blend of Example D | 415.5 |
| 2,6-di-tert-butyl p-cresol | 0.7 |
| Charge 2 | |
| Isophorone diamine | 78.6 |
| 4,4'-diaminodicyclohexylmethane | 32.4 |
| Charge 3 | |
| Cyclohexylamine | 125.4 |
| Charge 4 | |
| Acrylate/aspartate amine curative of Example C | 649.3 |

Charge 1 was added to a suitable reactor equipped with an overhead stirrer, thermocouple, condenser, and air sparge. Beginning at a temperature of 60° C., Charge 2 was added to the reactor over a period of 13 minutes. A mild exotherm was observed during the addition. At the completion of the addition, the temperature of the reaction mixture was 65° C. The contents of the reactor were held at a temperature of 59-64° C. for 2.9 hours. During this time the reaction mixture was sampled approximately hourly for attenuated total reflectance infrared spectroscopy. The first stage of the reaction was judged to be complete when no further change in absorbance was observed in the spectrum at approximately 1621 and 1635 cm−1. At a temperature of 63° C., Charge 3 was added to the reaction mixture over 8 minutes. At the completion of this addition, the temperature was raised to 70IC, and held for 2.8 hours, then raised to 78-84° C. and held for 3.25 hours. Inspection of the infrared spectrum of the reaction mixture indicated the consumption of acrylate (peaks at 1621, 1635 cm−1). Charge 4 was then added to the reaction mixture. The resulting material was found to have a measured solids content of (110° C., 1 hr) of 97.7 percent, a density of 8.53 lb/gal, a viscosity of Z4 on the Gardner-Holt scale, a total amine content of 3.919 meq/g, a residual primary amine content of 0.012 meq/g, a secondary amine content of 3.907 meq/g, and a tertiary amine content of 0.000 meq/g. Before the addition of Charge 4, the resulting product was found to have a $M_w$ of 1421 and a $M_n$ of 591 as determined by gel permeation chromatography vs. a polystyrene standard.

Example F

An acrylate modified amine curative was prepared from the following ingredients:

| Ingredient | Wt in g |
|---|---|
| Charge 1 | |
| JEFFAMINE D2000[2] | 3490.5 |
| 2,6-di-tert-butyl p-cresol | 7.77 |
| Dibutyltin dilaurate | 19.4 |
| Charge 2 | |
| Butyl acrylate | 437.9 |

[2]Polyoxyalkylenediamine of approximately 2000 MW, available from Huntsman Corporation.

Charge 1 was added to a suitable flask equipped with an overhead stirrer, thermocouple, condenser, and air inlet. The charge was placed under an air blanket. Beginning at a temperature of 22° C., Charge 2 was added to the flask over 18 minutes. No exotherm was observed. The reaction temperature was increased to 70° C. and held for 2.9 hours. Inspection of the infrared spectrum of the reaction mixture indicated the presence of unreacted acrylate (peaks at 1621, 1635 cm−1). The temperature of the reaction mixture was raised to 90° C. and held for 8.8 hours. At this point, the infrared spectrum of the mixture indicated that the acrylate had been consumed. The resulting material was found to have measured solids content (110° C., 1 hr) of 95.4 percent, a viscosity of G- on the Gardner-Holt scale, a total amine content of 0.884 meq/g, a primary amine content of 0.155 meq/g, a secondary amine content of 0.702 meq/g, a tertiary amine content of 0.022 meq/g, a $M_w$ of 2180, a $M_n$ of 769, and $M_z$ of 2993 as determined by gel permeation chromatography vs. a polystyrene standard.

Example G

An aspartate modified amine curative with a secondary non-aspartate amino group was prepared from the following ingredients:

| Ingredient | Wt in g |
|---|---|
| Charge 1 | |
| Dipropylene triamine | 2292.5 |
| 2,6-di-tert-butyl p-cresol | 10.5 |
| Charge 2 | |
| Diethyl maleate | 5779.2 |

Charge 1 was added to a suitable flask equipped with an overhead stirrer, thermocouple, condenser, and $N_2$ inlet. The charge was placed under an $N_2$ blanket. Beginning at a temperature of 22° C., Charge 2 was added to the flask over a period of 6 hours. An exotherm was observed during the addition. A maximum temperature of 49° C. was observed during the addition of this charge. At temperature of 48° C. (3.75 hours into the charge) cooling was applied to the reactor in the form of a stream of air. At a temperature of 49° C. (4.5 hours into the charge) an ice bath was applied to the reactor. At the completion of the charge, the temperature of the reaction mixture was 41° C. The reaction mixture was heated to a temperature of 50° C. with an external heat source and held at this temperature for 3.6 hours. Inspection of the infrared spectrum of the reaction mixture indicated consumption of diethyl maleate (disappearance of peak at 1646 cm−1). The resulting material was found to have measured solids content (110° C., 1 hr) of 97.4 percent, a viscosity of E on the Gardner-Holt scale, a density of 8.93 lb/gal, a total amine content of 6.303 meq/g, a residual primary amine content of 0.298 meq/g, a secondary amine content of 6.011 meq/g, a tertiary amine content of 0.044 meq/g, and a $M_w$ of 248 and a $M_n$ of 178 as determined by gel permeation chromatography vs. a polystyrene standard.

Example H

An oligomeric amine/acrylate curative was prepared from the following ingredients:

| Ingredient | Wt in parts |
|---|---|
| Charge 1 | |
| 3,3'-dimethyl-4,4'-diaminodicyclohexylmethane | 56.2 |
| 1,6-hexanediol diacrylate | 21.4 |
| Methyl acrylate | 22.4 |
| 4-methoxyphenol | 0.024 |

Charge 1 was added to an appropriate sized, 4-necked flask equipped with a motor driven stainless steel stir blade, water-cooled condenser, and a heating mantle with a thermometer connected through a temperature feedback control device. The contents of the flask were heated to 71-75° C. and held until residual methyl acrylate was 0.40 percent as determined by HPLC.

Example 1

An isocyanate functional "A" side formula was prepared from the following ingredients:

| Ingredient | % by wt |
| --- | --- |
| TERATHANE 650[3] | 21.0 |
| 1,2-butanediol | 1.2 |
| Neopenyl glycol | 1.2 |
| Isophorone diisocyanate | 27.1 |
| DESMODUR N 3400[4] | 49.4 |

[3]Polytetramethylene ether glycol, available from Invista.
[4]Aliphatic polyisocyanate resin based on hexamethylene diisocyanate, available from Bayer Corporation.

Terathane 650, neopenyl glycol, 1,2-butanediol, and a catalytic amount of dibutyltin dilaurate (0.013% by wt of the three glycols) were charged to a suitable reactor under nitrogen. Isophorone diisocyanate was added to the reactor over 105 minutes at a temperature range of 36-37° C. Over a period of 50 minutes the temperature of the mixture was increased to 52° C. Over a period of 60 minutes the temperature increased to a maximum of 125° C. After another 60 minutes the resulting prepolymer equivalent weight was found to be within specification. The resulting prepolymer was cooled to 71° C. and poured into 87.9% of the Desmodur N3400 and stirred for 30 minutes. The remaining Desmodur N 3400 was added to adjust to a final isocyanate equivalent weight of 264.9.

Examples 2-4

Pigment grinds were prepared according to the formulas in Table 1:

TABLE 1

| Ingredient | Example 2 | Example 3 | Example 4 |
| --- | --- | --- | --- |
| JEFFAMINE T3000[5] | | | 150.1 |
| JEFFAMINE D2000 | 303.0 | | |
| Oligomeric amine/acrylic curative of Example B | | 156.6 | |
| JEFFAMINE D2000/butyl acrylate adduct of Example F | | 166.9 | |
| Acrylate/aspartate amine curative of Example C | 335.5 | 313.0 | 218.6 |
| JEFFLINK 754[6] | 200.2 | | |
| DESMOPHEN NH 1420[7] | | 104.3 | |
| CLEARLINK 1000[8] | | | 190.8 |
| TINUVIN 292[9] | 10.8 | 10.4 | 7.1 |
| VULCAN XC72[10] | 13.0 | 12.5 | 8.6 |
| BENTONE 34[11] | 37.5 | 36.2 | 24.8 |

[5]Polyoxyalkylenetriamine of approximately 3000 MW, available from Huntsman Corporation.
[6]Aliphatic secondary amine, available from Huntsman Corporation.
[7]Asparatic ester amine, available from Bayer Corporation.
[8]Aliphatic secondary amine, available from Dorf-Ketal Chemicals, LLC.
[9]Hindered amine light stabilizer, available from Ciba Speciality Chemicals Corporation.
[10]Carbon black pigment, available from Cabot Corporation.
[11]Organoclay rheology additive, available from Elementis Specialities, Inc.

In each example, the ingredients were combined and charged to a Model M250 bead mill (Elger Machinery, Inc.) with 188 mL Zirconox 1.0 mm beads (Jyoti Ceramic Industries Pvt. Ltd.) and ground at a mill speed of 3500 rpm. The grinds were judged to be complete when the particle size was found to be 7.5 Hegman upon drawdown on a fineness of grind gauge.

Examples 5-7

The following "B" side formulations were produced as shown in Table 2:

TABLE 2

| Ingredient | Example 5 | Example 6 | Example 7 |
| --- | --- | --- | --- |
| Pigment grind of Example 2 | 232.9 | | |
| Pigment grind of Example 3 | | 115.01 | |
| Pigment grind of Example 4 | | | 167.9 |
| Jeffamine D2000 | 3.02 | | |
| Oligomeric amine acrylate curative of Example A | 42.0 | | |
| Oligomeric amine/acrylate curative of Example B | | 22.50 | |
| Acrylate/aspartate amine curative of Ex. C | | 0.87 | 10.6 |
| Oligomeric amine/acrylate curative of Ex. E. | | | 20.0 |
| Amine/aspartate of Ex. G. | | 10.5 | |
| Dibutyltin dilaurate | 2.10 | 1.13 | 1.50 |

The B side formulations of Table 2 above and the A side formulation of Example 1 were charged to separate canisters and heated to 140° F. (Examples 5 and 6) and 160° F. (Example 7) in an oven for 4-6 hrs prior to spraying. Polyurea coating compositions were produced by mixing a 1:1 volume ratio of the A-side components to each the B-side components in a static mix tube applicator device available from Cammda Corporation. In Examples 5 and 6, the coating compositions were applied to cold rolled steel panels coated with an electrodeposition primer and an epoxy acid clearcoat (APR 26241 available from ACT Laboratories, Inc.) In Example 7, the coatings were applied to steel panels coated with DuPont GEN V clearcoat. Tack times for the coatings were determined by periodically touching the panel with a gloved hand as previously described and were judged to be tack free when the glove no longer stuck to the coatings.

Hardness values were determined by charging the A and B side components into a double-barreled syringe equipped with a static mix tube and a "Pneumatic applicator" (PC Cox Limited) and injecting the components at a 1:1 ratio using a into a mold to form a round "puck" of approximately 6 cm in diameter and 0.2 cm in thickness. The hardness of the polyurea coating puck at ambient temperature was measured on the Shore D scale with a Model 212 Pencil Style Digital Durometer (Pacific Transducer Corp.) 1 day after application. The pucks were then placed in a 140° F. "hot room" for 1 day and the Shore D hardness of the coating measured with the puck in the hot room to prevent cooling. The pucks were removed from the hot room to ambient temperature and the hardness measured again at ambient temperature after 1 day.)

The ratio of equivalents of isocyanate to amine was calculated as being approximately 1.12 for the polyurea formulation comprising the B side component of Example 5, 1.11 for the polyurea formulation comprising the B side component of Example 6, and 1.11 for the polyurea formulation comprising the B side of Example 7.

Table 3 shows results of characterization of the resulting coatings:

TABLE 3

|  | Example 5 | Example 6 | Example 7 |
|---|---|---|---|
| Tack free time (sec) | 19 | 17 | 12 |
| Hardness (Shore D) measured at ambient temperature, 1 day after cure | 62 | 67 | 69 |
| Hardness (Shore D) after 1 days at 140° F. | 34 | 33 | 30 |
| Hardness (Shore D) after 1 day at ambient temperature after 1 day at 140° F. | 65 | 74 | 70 |

Whereas particular embodiments of this invention have been described above for purposes of illustration, it will be evident to those skilled in the art that numerous variations of the details of the present invention may be made without departing from the invention as defined in the appended claims.

Therefore, what is claimed is:

1. A coating composition comprising polyurea formed from a reaction mixture comprising:
   a) a first component comprising isocyanate; and
   b) a second component comprising an amine/(meth)acrylate oligomeric reaction product of a polyamine, a poly(meth)acrylate and a mono(meth)acrylate, wherein the polyamine contains at least two amine groups, and wherein the ratio of equivalents of isocyanate groups to equivalents of amine groups is greater than 1 and the isocyanate and the amine/(meth)acrylate oligomeric reaction product can be applied to a substrate at a volume mixing ratio of 1:1.

2. The coating composition of claim 1, wherein the ratio of equivalents of isocyanate groups to equivalents of amine groups is 1.01 to 1.15:1.0.

3. The coating composition of claim 1, wherein the ratio of equivalents of isocyanate groups to equivalents of amine groups is 1.01 to 1.5:1.0.

4. The coating composition of claim 1, wherein the isocyanate comprises isocyanate prepolymer.

5. The coating composition of claim 1, wherein the polyamine comprises isophorone diamine.

6. The coating composition of claim 1, wherein the polyamine comprises 4,4'-diaminodicyclohexylmethane.

7. The coating composition of claim 1, wherein the polyamine comprises 3,3'-dimethyl-4,4'-diaminodicyclohexyl methane.

8. The coating composition of claim 1, wherein the amine/(meth)acrylate oligomeric reaction product comprises mono(meth)acrylate, and the mono(meth)acrylate comprises methyl acrylate, methyl methacrylate, ethyl acrylate, and/or butyl acrylate.

9. The coating composition of claim 1, wherein the poly(meth)acrylate comprises 1,6-hexanediol diacrylate and/or trimethylolpropane triacrylate.

10. The coating composition of claim 1, further comprising one or more additional amines.

11. The coating composition of claim 10, wherein the one or more additional amines comprise the reaction product of a (meth)acrylate, a dialkyl maleate and/or dialkyl fumarate, and an amine.

12. The coating composition of claim 10, wherein the one or more additional amines comprise one or more of a. a diamine of structure

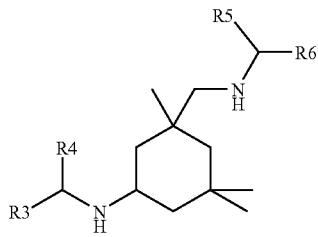

wherein R3-R6 are independently C1-C10 alkyl;
b. a diamine of structure

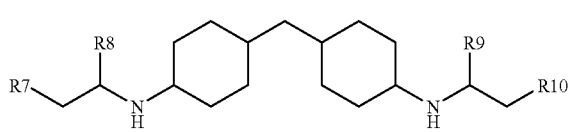

wherein R7-R10 are independently C1-C10 alkyl;
c. a polyoxyalkylenediamine and/or a polyoxyalkylenetriamine comprising primary and/or secondary amino groups;
d. an aspartic ester functional diamine with no other functionality that is reactive with isocyanate;
e. a reaction product of a triamine with diethyl maleate and/or dibutyl maleate; and/or
f. a reaction product of a polyamine and a mono or polyepoxy.

13. The coating composition of claim 1, comprising two or more amine/(meth)acrylate oligomeric reaction products, wherein the (meth)acrylate(s) and amine(s) in each reaction product can be the same or different.

14. The coating composition of claim 1, wherein the amine/(meth)acrylate oligomeric reaction product comprises a polyamine, a poly(meth)acrylate and a mono(meth)acrylate.

15. The coating composition of claim 14, wherein the polyamine comprises isophorone diamine, the poly(meth)acrylate comprises hexanediol diacrylate and the mono(meth)acrylate comprises butyl acrylate.

16. The coating composition of claim 14, wherein the poly(meth)acrylate comprises tri(meth)acrylate.

17. A method for coating a substrate comprising:
   applying to at least a portion of the substrate the coating composition of claim 1.

18. A substrate coated at least in part with the coating of claim 1.

19. The substrate of claim 18, wherein the substrate comprises at least a portion of a vehicle.

20. The substrate of claim 19, wherein the substrate comprises a truck bed.

21. The substrate of claim 18, wherein the substrate comprises at least a portion of a building structure.

22. The substrate of claim 20, wherein the truck bed has been coated at least in part with a clearcoat having low surface functionality after cure prior to application of the polyurea.

23. The coating of claim 1, wherein the reaction index is 1.01 to 1.5:1.

24. The coating composition of claim 1, wherein the isocyanate is free isocyanate.

25. The method of claim 17, wherein the first and/or second components of the coatings composition are heated prior to application to the substrate.

* * * * *